United States Patent
Woodell et al.

(10) Patent No.: US 8,089,391 B1
(45) Date of Patent: Jan. 3, 2012

(54) WEATHER RADAR SYSTEM AND METHOD USING DATA FROM A LIGHTNING SENSOR

(75) Inventors: Daniel L. Woodell, Cedar Rapids, IA (US); Kevin M. Kronfeld, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 125 days.

(21) Appl. No.: 12/360,651

(22) Filed: Jan. 27, 2009

Related U.S. Application Data

(63) Continuation of application No. 11/370,085, filed on Mar. 7, 2006, now Pat. No. 7,515,087.

(51) Int. Cl.
| | |
|---|---|
| G01S 13/95 | (2006.01) |
| G01S 13/86 | (2006.01) |
| G01W 1/00 | (2006.01) |
| G01S 13/00 | (2006.01) |

(52) U.S. Cl. ............... 342/26 B; 342/26 R; 342/175; 342/176; 342/181; 342/182; 342/450; 342/451; 342/460; 702/1; 702/2; 702/3; 702/4; 73/170.16

(58) Field of Classification Search ........ 342/26 R–26 D, 342/52–58, 175–182, 195, 198, 450, 451, 342/460, 463–465, 351; 702/1–4; 324/72, 324/72.5; 73/170.16, 170.24; 345/418–427
See application file for complete search history.

(56) References Cited

U.S. PATENT DOCUMENTS

| | | | |
|---|---|---|---|
| 3,508,259 A | * | 4/1970 | Andrews ............... 342/26 R |
| 3,803,609 A | * | 4/1974 | Lewis et al. ............ 342/26 D |
| 4,835,536 A | | 5/1989 | Piesinger et al. |
| 4,914,444 A | | 4/1990 | Pifer et al. |
| 5,036,334 A | * | 7/1991 | Henderson et al. ......... 342/460 |
| 5,049,886 A | | 9/1991 | Seitz et al. |
| 5,077,558 A | | 12/1991 | Kuntman |
| 5,198,819 A | | 3/1993 | Susnjara |
| 5,291,208 A | | 3/1994 | Young |
| 5,311,183 A | | 5/1994 | Mathews et al. |
| 5,331,330 A | | 7/1994 | Susnjara |
| 5,396,220 A | * | 3/1995 | Markson et al. ........ 73/170.24 |
| 5,517,193 A | | 5/1996 | Allison et al. |
| 5,521,603 A | | 5/1996 | Young |
| 5,583,972 A | | 12/1996 | Miller |
| 5,757,322 A | | 5/1998 | Ray et al. |
| 5,771,020 A | | 6/1998 | Markson et al. |
| 5,945,926 A | | 8/1999 | Ammar et al. |
| 6,201,494 B1 | | 3/2001 | Kronfeld |
| 6,208,284 B1 | | 3/2001 | Woodell et al. |

(Continued)

OTHER PUBLICATIONS

Goodman et al., Lisdad Lightning Observations during the Feb. 22-23, 1998 Central Florida Tornado Outbreak, posted on the internet at noaa.gov, dated Jun. 1, 1998, 5 pages.

(Continued)

*Primary Examiner* — Bernarr Gregory
(74) *Attorney, Agent, or Firm* — Donna P. Suchy; Daniel M. Barbieri

(57) ABSTRACT

A weather radar system or method can be utilized to determine a location of a weather hazard for an aircraft. The weather radar system can utilize processing electronics coupled to an antenna. The processing electronics can determine presence of the hazard in response to data related to returns received by the weather radar antenna and data from a lightning sensor. The system can include a display for showing the hazard and its location.

20 Claims, 8 Drawing Sheets

U.S. PATENT DOCUMENTS

| | | |
|---|---|---|
| 6,246,367 B1 | 6/2001 | Markson et al. |
| 6,388,607 B1 | 5/2002 | Woodell |
| 6,388,608 B1 | 5/2002 | Woodell et al. |
| 6,405,134 B1 | 6/2002 | Smith et al. |
| 6,424,288 B1 | 7/2002 | Woodell |
| 6,456,226 B1 | 9/2002 | Zheng et al. |
| 6,512,476 B1 | 1/2003 | Woodell |
| 6,549,161 B1 | 4/2003 | Woodell |
| 6,560,538 B2 | 5/2003 | Schwinn et al. |
| 6,577,947 B1 | 6/2003 | Kronfel et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,683,609 B1 * | 1/2004 | Thompson et al. ........... 345/419 |
| 6,690,317 B2 | 2/2004 | Szeto et al. |
| 6,741,203 B1 | 5/2004 | Woodell |
| 6,744,382 B1 | 6/2004 | Lapis et al. |
| 6,788,043 B2 | 9/2004 | Murphy et al. |
| 6,791,311 B2 | 9/2004 | Murphy et al. |
| 6,850,185 B1 | 2/2005 | Woodell |
| 6,879,280 B1 | 4/2005 | Bull et al. |
| 6,882,302 B1 | 4/2005 | Woodell et al. |
| 7,042,387 B2 | 5/2006 | Ridenour et al. |
| 7,082,382 B1 | 7/2006 | Rose, Jr. et al. |
| 7,200,491 B1 | 4/2007 | Rose, Jr. et al. |
| 7,307,576 B1 * | 12/2007 | Koenigs ...................... 342/26 R |
| 7,307,583 B1 | 12/2007 | Woodell et al. |
| 7,383,131 B1 | 6/2008 | Wey et al. |
| 7,515,087 B1 | 4/2009 | Woodell et al. |
| 2003/0016156 A1 | 1/2003 | Szeto et al. |
| 2005/0049789 A1 | 3/2005 | Kelly et al. |
| 2006/0036366 A1 | 2/2006 | Kelly et al. |

OTHER PUBLICATIONS

Office Action for U.S. Appl. No. 12/177,767 dated Nov. 25, 2009, 7 pages.

Wilson et al., The Complementary Use of Titan-Derived Radar and Total Lightning Thunderstorm Cells, proceedings of the 32nd Conference on Radar Meteorology, paper posted on the internet at ou.edu, paper presented on Oct. 16, 2005, 10 pages.

Final Office Action dated Oct. 9, 2008 for U.S. Appl. No. 11/370,085, 5 pages.

Hodanish, Stephen, Integration of Lightning Detection Systems in a Modernized National Weather Service Office; National Weather Service Office in Melbourne, Florida, pp. 1-5; viewed on Aug. 6, 2007 at http://www.srh.noaa.gov/m1b/hoepub.html.

Meteorological/KSC/L71557/Lighting Detection and Ranging (LDAR), no author given; Jan. 2002, pp. 1-12.

Non-Final Office Action dated Aug. 15, 2007 for U.S. Appl. No. 11/370,085, 8 pages.

Non-Final Office Action dated Dec. 4, 2007 for U.S. Appl. No. 11/370,085, 13 pages.

Pessi, et al., On the Relationship Between Lightning and Convective Rainfall Over the Central Pacific Ocean, Feb. 28, 2004, 9 pages.

* cited by examiner

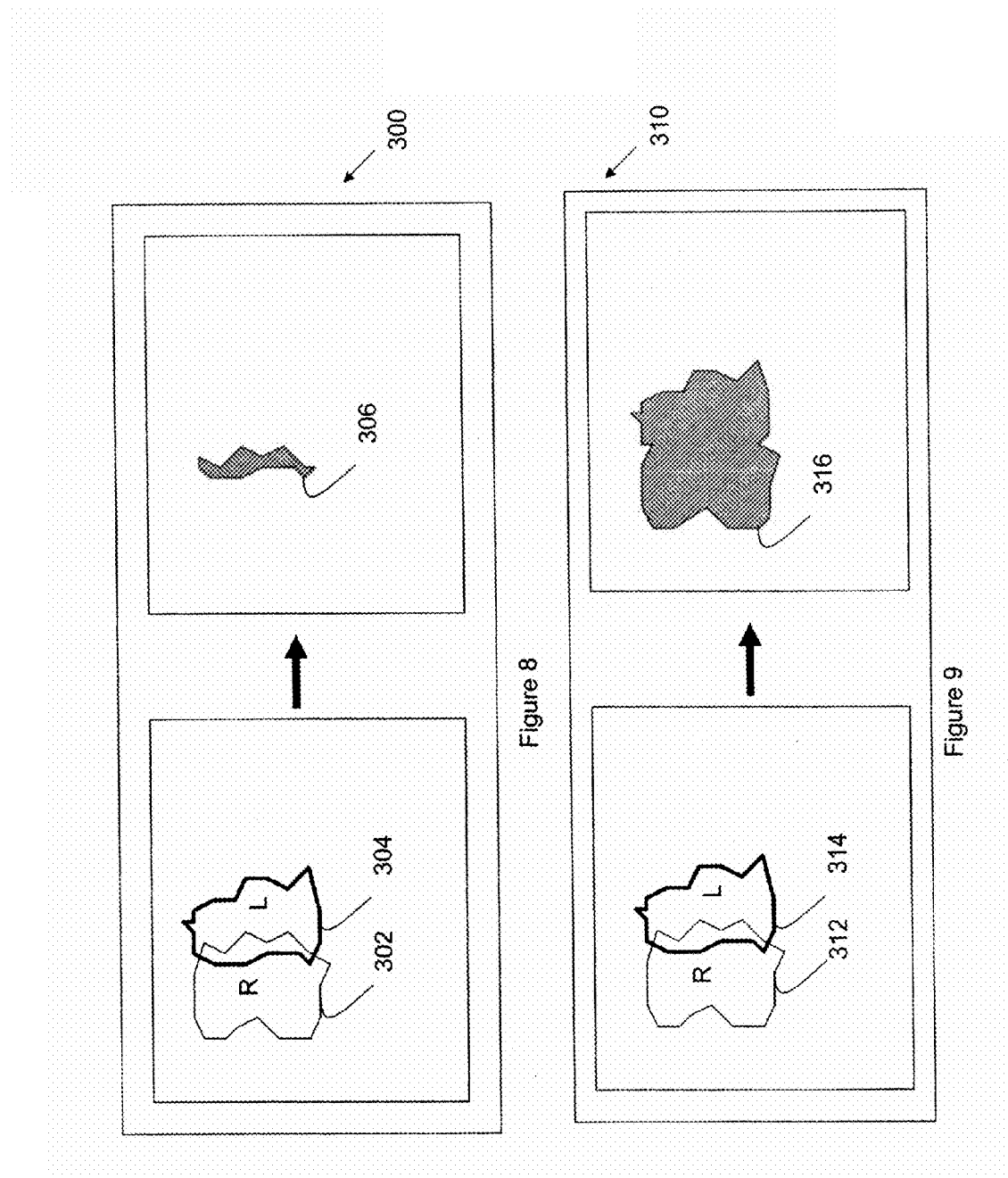

WEATHER RADAR SYSTEM AND METHOD USING DATA FROM A LIGHTNING SENSOR

CROSS-REFERENCE TO RELATED PATENT APPLICATIONS

This application is a continuation of U.S. application Ser. No. 11/370,085, filed Mar. 7, 2006 now U.S. Pat. No. 7,515,087, incorporated herein by reference in its entirety.

FIELD

The present application relates generally to the identification of hazards or potential hazards. More particularly, the present application relates to a method of and a system for identifying convective and non-convective cells using a weather radar system.

BACKGROUND

U.S. Pat. No. 6,424,288 invented by Daniel L. Woodell and assigned to the assignee of the present application discloses a system for and methods of displaying radar information using weather radar systems. U.S. patent application Ser. No. 11/153,972, filed on Jun. 16, 2005 by Daniel L. Woodell and assigned to the assignee of the present application discloses a weather radar system for detecting hazardous and potentially hazardous weather. U.S. Pat. No. 6,201,494 filed on Jul. 30, 1999 by Kronfeld and assigned to the assignee of the present application discloses an automatic storm finding weather radar. U.S. Pat. No. 6,577,947, filed on Mar. 1, 2002 by Kronfeld et al. and assigned to the assignee of the present application discloses a method and apparatus for identification of hazards along an intended travel route.

Hazardous weather is generally associated with convective weather cells. Convective weather cells can produce turbulence, high winds, lightning, hail, and other weather hazards. With the large amount of air traffic and rising fuel costs, pilots are interested in identifying convective cells (e.g., often hazardous weather) from non-convective cells (e.g., stratiform rain) so they do not unnecessarily avoid flight routes through non-hazardous weather.

Lightning is generally caused by an updraft of induced charges. Generally, cells that are producing lightning are turbulent and have the capacity to produce hail. Therefore, the presence of lightning in a particular area can be an indication of the presence of a convective cell or at least a potentially hazardous weather region.

Weather radar systems generally include an antenna, a receiver/transmitter circuit, a processor, and display. The processor is coupled between the display and the receiver/transmitter circuit. The receiver/transmitter circuit is coupled between the processor and the antenna. The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Conventionally, pilots use weather radar systems to detect and avoid hazardous weather. The radar return signals are processed to provide graphical images to a radar display. The radar display is typically a color display providing graphical images in color to represent the severity of weather. Some aircraft weather radar systems also include other hazard detection systems such as a turbulence detection system. The turbulence detection system can provide indications of the presence of turbulence or other hazards. Conventional weather radar systems include those manufactured by Rockwell Collins, Inc., Honeywell International, Inc. and others.

Some aircraft also utilize lightning sensors or lightning detection systems. Conventional lightning detection systems or lightning sensors include automatic direction finding (ADF-like) equipment at radio frequency (RF) or by narrow band optical imaging systems. Lightning sensors can include a display for showing the presence of lightning strikes with respect to the position of the aircraft.

Generally, lightning sensors on board aircraft have the ability to detect a rough spatial location of lightning strikes at a relatively significant range. However, lightning sensors do not have the ability to accurately and precisely locate and identify convective weather cells. Heretofore, lightning detection systems have not been effectively utilized with aircraft weather radar systems.

Both lightning sensors and weather radar systems have regions in their weather search range that are more accurate then other regions. Generally, lightning sensors have the ability to detect lightning strikes at long range, but cannot locate the distance to such lightning striking with a high degree of accuracy. High performance weather radar systems can detect weather at substantial ranges but at some ranges have difficulty in determining whether or not an illuminated weather cell is hazardous.

Weather radar systems that utilize spectral width methods to ascertain weather hazards are generally used at ranges less then forty nautical miles because these methods are not as accurate at ranges greater then forty nautical miles. High performance weather radar systems can also utilize vertical reflectivity (e.g., cloud height) as an indicator of cell hazardousness. However, weather radar systems utilizing hazard detection methods based upon vertical reflectivity are limited in accuracy at longer ranges because the smaller antenna diameter of these systems prevents more accurate estimations of storm height.

In addition, certain weather phenomena (such as not convective or convective and dissipating weather cells that have substantial returns) are indicated as hazardous weather even though they are not necessarily hazardous. When the weather radar system indicates hazardous weather in response to this weather phenomena, the weather radar system unnecessarily provides hazard warnings and behaves more like a simple rain gauge than a hazard detector.

Lightning sensors can detect lightning at ranges far in excess of a weather radar system's ability to ascertain the level of a weather hazard. However, lightning sensors and lightning detection systems are generally not provided on aircraft because of their inherent range inaccuracy even though they provide accurate bearing estimations. Further, lightning detection by lightning sensors is generally only spatially correlated with hail and turbulence at scale lengths comparable to or greater than a typical size of a convective weather cell. Therefore, a lightning sensor is most accurate at pointing to the bearing of a cell that is producing lightning, and is less accurate at producing a range estimate to a hazard and identifying an aircraft sized path of safe passage.

Thus, there is a need for a system for and a method of detecting convective cells or hazards associated therewith using a weather radar system and a lightning sensor. There is also a need to detect and locate convective weather cells associated with hazards as opposed to non-convective, isolated cells. Further still, there is a need for real time or pseudo-real time convective cell or hazard determination using an aircraft weather radar system and a lightning sensor. Yet further, there is a need for a weather radar system optimized to determine the location and presence of hazards and/or convective cells. Yet further still, there is a need for a hybrid hazard detection system that more accurately detects and locates convective cells and/or hazards, using lightning sensor data so that a pilot can avoid hazardous conditions. There is also a need for a weather radar system complemented by data from a lightning sensor that can determine and locate convective cells and hazards associated therewith. Even further, there is a need for a weather radar system that can more accurately identify and locate hazard areas using lightning sensor data. Even further still, there is a need to queue and control the radar in azimuth in response to lightning data.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

The exemplary embodiment relates to a weather radar system. The weather radar system includes an input for receiving lightning detection data and processing electronics. The processing electronics are for determining a presence of a convective cell or hazard associated therewith. The processing electronics receive weather data and lightning detection data. The weather radar data is related to radar returns. The processing electronics determines a position of the convective cell or hazard associated therewith in response to the weather radar data and the lightning data.

Another exemplary embodiment relates to a method of displaying a convective cell or hazard associated therewith on an aircraft display in an avionic system. The method includes receiving lightning sensor data, receiving radar returns, and providing an indication of the convective cell or hazard associated therewith using the radar return and the lightning data.

Still another exemplary embodiment relates to an apparatus for determining a presence of a convective cell or hazard associated therewith for an aircraft. The apparatus includes means for determining a location of cells from weather radar returns, means for determining a presence of lightning, and means for displaying the convective cell or hazard associated therewith on a display in response to the presence of lightning and the location of cells.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 8 is a general block diagram showing a cross-correlation algorithm for determining the location of a convective cell for use in the system illustrated in FIG. 1 in accordance with yet still another exemplary embodiment;

FIG. 9 is a general block diagram showing a combination algorithm for determining the location of a convective cell to use in the system illustrated in FIG. 1 in accordance with yet still another exemplary embodiment.

DETAILED DESCRIPTION OF THE PREFERRED EMBODIMENTS

Figure 1:
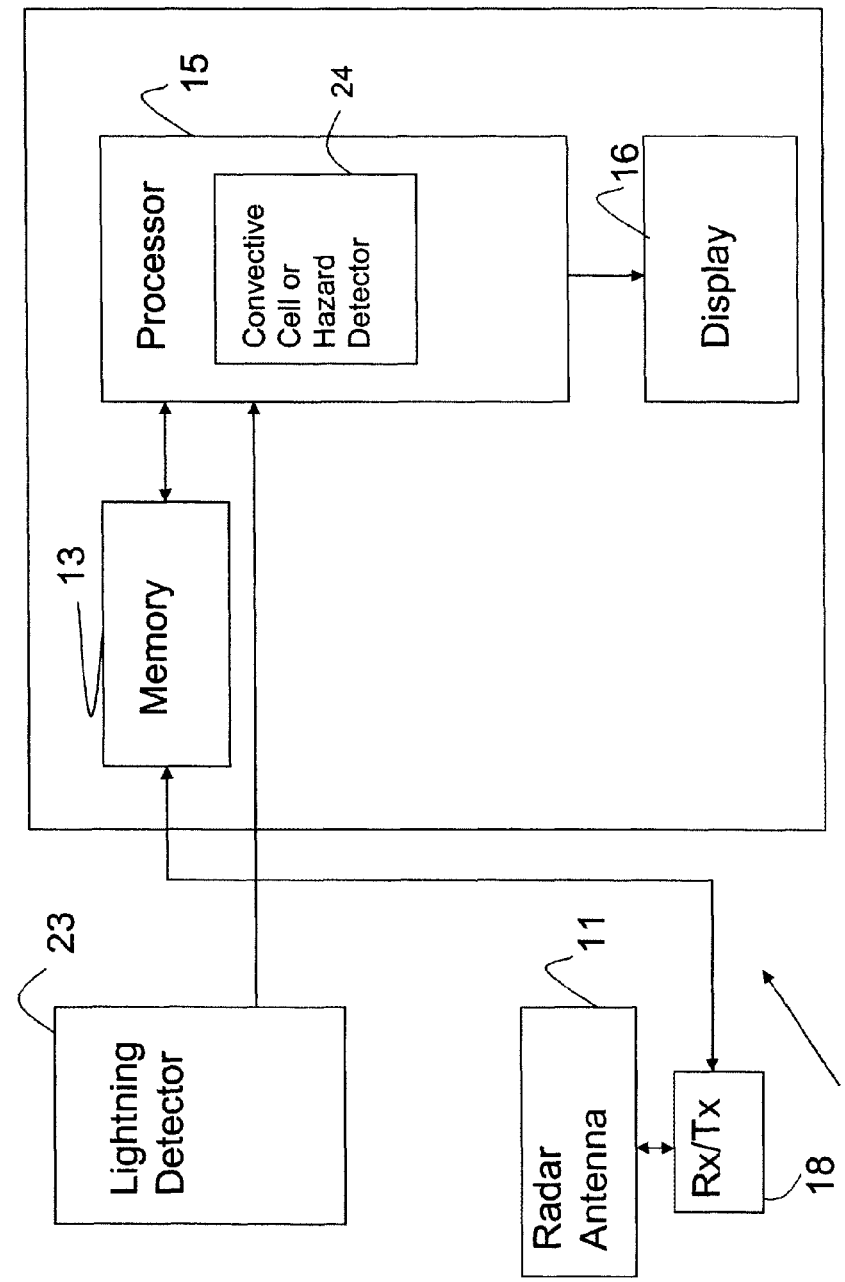
FIG. 1 is an exemplary general block diagram of a weather radar system in accordance with an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, a weather radar system 10 which may be used on an aircraft is depicted. Weather radar system 10 can be similar to the system described in U.S. Pat. No. 6,388,608, the entirety of which is hereby incorporated by reference or in U.S. patent application Ser. No. 11/153,972, filed Jun. 16, 2005, the entirety of which is hereby incorporated by reference. System 10 advantageously includes a hazard or convective cell detector 24 that is not available in conventional systems.

System 10 is advantageously configured to receive lightning sensor data. In one embodiment, system 10 is coupled to a lightning detector 23 as described below. Advantageously, convective cell detector 24 can provide convective cell information and/or hazard information, such as gust advisory information and lightning hazard information on a display 16 to improve pilot situational awareness, improve passenger safety, and decrease maintenance due to weather on aircraft.

Lightning detector 23 is an airborne lightning sensor that provides an azimuth, time, and frequency amplitude from the aircraft to the lightning flash. Detector 23 can derive a range interval from the frequency amplitude information. Applicants believe such combined information alone can be inadequate for determining an accurate position of the lightning flash or for determining the presence of convection.

Existing techniques for correlating lightning data use clustering techniques rely solely on the lightning data. Those techniques are inadequate for an airborne solution because airborne lightning sensors do not provide latitude and longitude of the lightning data. The hybrid approach of system 10 advantageously correlates radar reflectivity and lightning data to overcome the shortcomings of the lightning strike inaccuracy. The hybrid approach determines lightning strike position relative to radar reflectivity measurements, with sufficient accuracy, to make a convective assessment on a weather event.

Lightning detector 23 is a lightning sensor that can be integrated within system 10 or be a separate unit from system 10. Lightning detector 23 can be aboard the aircraft associated with system 10 or can be an onboard system communicating wirelessly with system 10. Detector 23 preferably provides lightning data indicative of the presence and/or location of lightning strikes. The lightning data can be raw data from detector 23 or processed data that indicates a location and presence for each lightning strike. In one embodiment, the lightning data points toward or indicates the bearing of detected lightning strikes.

System 10 advantageously uses weather radar ranging and cell identification in a multi-scan or volumetric radar system paired with a lightning detector's angle to a lightning strike to build a threat description on display 16. Applicants believe that using lightning data allows system 10 to identify and detect weather cells at ranges longer than a conventional radar is capable. Applicants believe that the identification of convective cells (and hazards associated therewith) with system 10 is within ranging accuracy that is superior to a conventional lightning detector.

System 10 preferably includes a radar antenna 11, a processor 15, a memory 13, a display 16 and a receiver/transmitter circuit 18. System 10 is advantageously configured to include hazard detector 24. In a preferred embodiment, convective cell detector 24 is part of processor 15. Alternatively, convective cell detector 24 can be coupled to processor 15, to another part of system 10, or to other aircraft electronics. Detector 24 can be configured solely as a convective cell detector or as a hazard detector.

Convective cell detector 24 is shown in FIG. 1 as part of processor 15 and as receiving inputs from processor 15, lightning detector 23 or other components within system 10. However, detector 24 can receive parameters and data from various aircraft instrumentation to make a convective cell or hazard determination. Detector 24 can be operated in conjunction with the operations of processor 15 or separately from the operations of processor 15. Detector 24 can be embodied as its own software routine operating on its own platform or line replaceable unit. Similarly, lightning detector 23 can be embodied as its own software routine operating on its own platform or line replaceable unit or embodied as part of detector 24.

In a preferred embodiment, weather radar system 10 is a pulse Doppler radar system. System 10 preferably includes a weather radar return processing unit (e.g., processor 15) that can calculate standard deviations of wind velocities, a mean velocity parameter, a spectral width parameter, a range parameter, and reflectivity parameter to generate turbulence alerts, and to provide a display signal to display 16. In one embodiment, system 10 detects reflectivity by measuring the power of the returned signal. Velocity is measured by detecting changes in phase angle of returned pulses. Spectral width is measured by detection variation in change of phase angle of returned pulses.

Display 16 preferably provides color graphical images corresponding to the intensity of the radar returns. The graphical images can represent weather regions, rainfall densities, turbulence regions, etc. Convective cell detector 24 causes display 16 to provide visual indications of potential hazards and/or convective cells. In one embodiment, audio alerts are also provided.

System 10 can be a multi-scan radar system or similar system manufactured by Rockwell Collins configured to include the features associated with convective cell detector 24 and lightning detector 23. According to certain embodiments, system 10 can be an RDR 4000 system or similar system manufactured by Honeywell International, Inc. configured to include the features associated with convective cell detector 24 and lightning detector 23. The type of weather radar system is not disclosed in a limiting fashion. The principles of the present invention are applicable to any aircraft weather radar system in which sensing of potential and actual convective cells and/or hazards is performed or desired.

Advantageously, system 10 (e.g., convective cell detector 24) can determine the presence of a convective cell or hazard by utilizing data derived from weather radar returns received from circuit 18 and data derived from lightning detection data from lightning detector 23. Processor 15 and/or detector 24 can utilize the lightning detector data and the weather radar detector to determine the presence of a convective cell or weather hazard. For example, if lightning detector 23 indicates that lightning is occurring at a particular heading or a particular direction from the aircraft and the weather radar data indicates that a cell is located in that direction, processor 15 and convective cell detector 24 can mark that cell on display 16 as being a convective cell because lightning indicates the presence of a conductive cell which may contain hail, lightning or high turbulence. In this way, a weather radar system is complemented by the use of data from lightning detector 23.

Weather radar system 10 advantageously uses lightning detector data and weather radar returns to identify and locate hazards as a hybrid system. Three exemplary algorithms for identifying convective cells are discussed below with reference to FIGS. 8-10.

Hazard and convective cell indications can be provided on display 16 in a number of fashions. In one exemplary embodiment, cells that are evaluated as potential lightning hazards can be identified by an icon that encompasses the entire weather cell or an individual threat icon. Alternatively, an individual threat icon (e.g., a lightning bolt) can be embedded at the cell center. Further, a color or colored border can be utilized to identify the cell with the potential lightning hazard. In another embodiment, the icon can fade or change color as the period of time (after which the triggering thresholds are no longer met) expires. In addition, hazards can be identified on display 16 as a cell labeled with the letter "C" or a color border to indicate a convective cell.

The details about system 10 are provided in an exemplary fashion. The principles of the present application are applicable to any weather radar system utilizing radar data for a display. The various components and circuits described below can be implemented in almost any hardware or software configuration depending upon design parameters and system criteria.

In a preferred embodiment, processor 15 and circuit 24 are implemented in software subroutines. The subroutines can be executed on one or more digital signal processors associated with system 10. In one embodiment, system 10 uses a hardware platform of a WXR-2100 weather radar system manufactured by Rockwell Collins, Inc. or an RDR 4000 weather radar system manufactured by Honeywell International, Inc. However, the present invention is not limited to any type of hardware platform.

Lightning detector 23 is preferably a Storm Scope™ ADF lightning sensor, narrow band optical imaging system, or other sensor for determining the presence of lightning strikes. Detector 23 preferably also provides a bearing to lightning strikes and an estimated location of lightning strikes. Detector 23 may also provide polarity of lightning strike and lightning strike type: cloud-to-ground, cloud-to-cloud, etc. In one example, the lightning detector can be an LD-250 lightning detector configured for communication with detector 24.

In one embodiment, detector 23 provides the data in range and azimuth form to processor 15 indicating the location and presence of lightning strikes or at least the bearing from the aircraft to the lightning strike. Alternatively, processor 15 can obtain raw data from lightning detector 23 and determine presence and location of lightning strikes from the raw data.

Detector 23 can be a detector purchased from Boltek Company or L3 modified to be used with system 10. Alternatively, detector 23 can be a ground based detector system and lightning data can be provided by transmission to the aircraft. In one embodiment, detector 23 is simplified by only providing angle to lightning strike information as discussed with reference to FIG. 3 so that detector 23 can become a simpler and less expensive wideband ADF design.

An antenna for detector 23 can be located at a base of a pedestal boom and utilize the pedestal power associated with weather radar system 10 and its interface to the remote radar transceiver circuit 18. In addition, the antenna for detector 23 can use the current weather radar mechanical pedestal structure associated with antenna 11.

Advantageously, system 10 can be configured for self-calibration. Convective cells can be correlated with lightning tracks to determine a consistent azimuth bias. The bias can be identified over time by comparing the azimuth difference from the detections from detector 23 and detector 24. Once the azimuth bias is known, it can be removed to calibrate the azimuth response of detector 23 (e.g., by adding or subtracting the bias). That bias may vary over the azimuth range of detector 23 or with movement of antenna 11. Data can be collected to determine the azimuth bias on a per range and/or movement of antenna 11 basis. The calculation of bias and correction of bias can be performed by detector 24.

Figure 2:
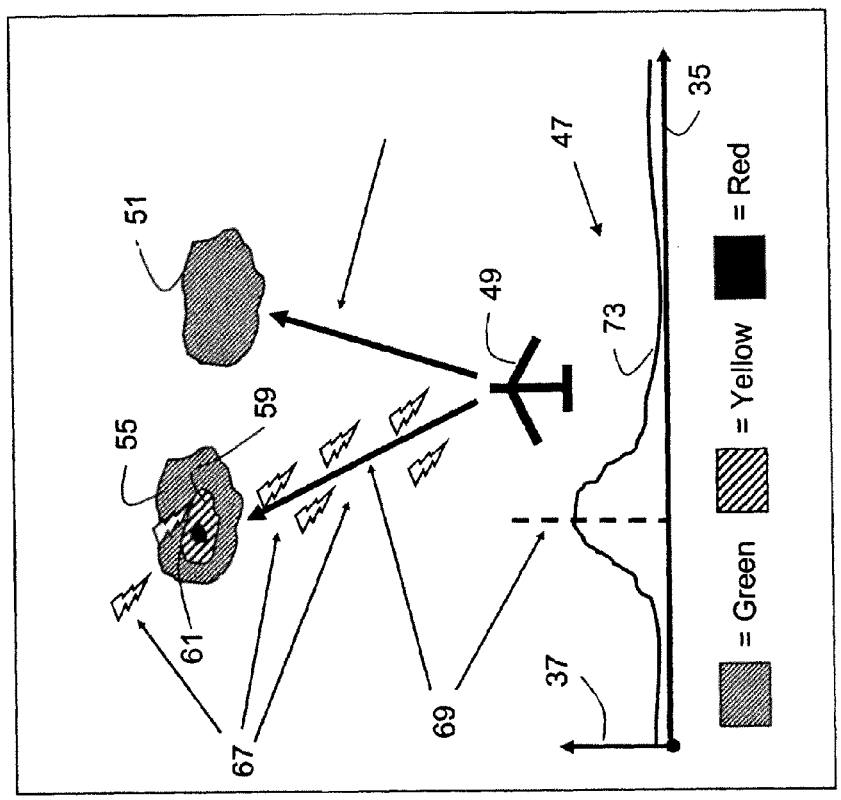
FIG. 2 is a schematic illustration of an aircraft flying in a space containing weather including lightning and weather that does not include lightning.

With reference to FIGS. 1 and 2, processor 15 of system 10 provides signals, either directly to receiver/transmitter circuit 18 or indirectly through memory 13, to provide radar beams at radar antenna 11. Preferably, processor 15 is configured to operate system 10 as a pulse Doppler multi-scan, multi-tilt angle radar system or a volumetric radar system in which radar beams are produced at more than one tilt angle. Processor 15 receives radar returns through receiver/transmitter circuit 18.

Processor 15 can receive the radar returns (or signals/data related thereto) directly or through memory 13. Similarly, processor 15 can receive the lightning data either directly or through memory 13. Receiver/transmitter circuit 18 can be a single path or can have separate circuits for a receive path and a transmit path. Processor 15 can determine a reflectivity parameter, a mean velocity parameter and/or a spectral width parameter for use by detector 24.

Figure 5:
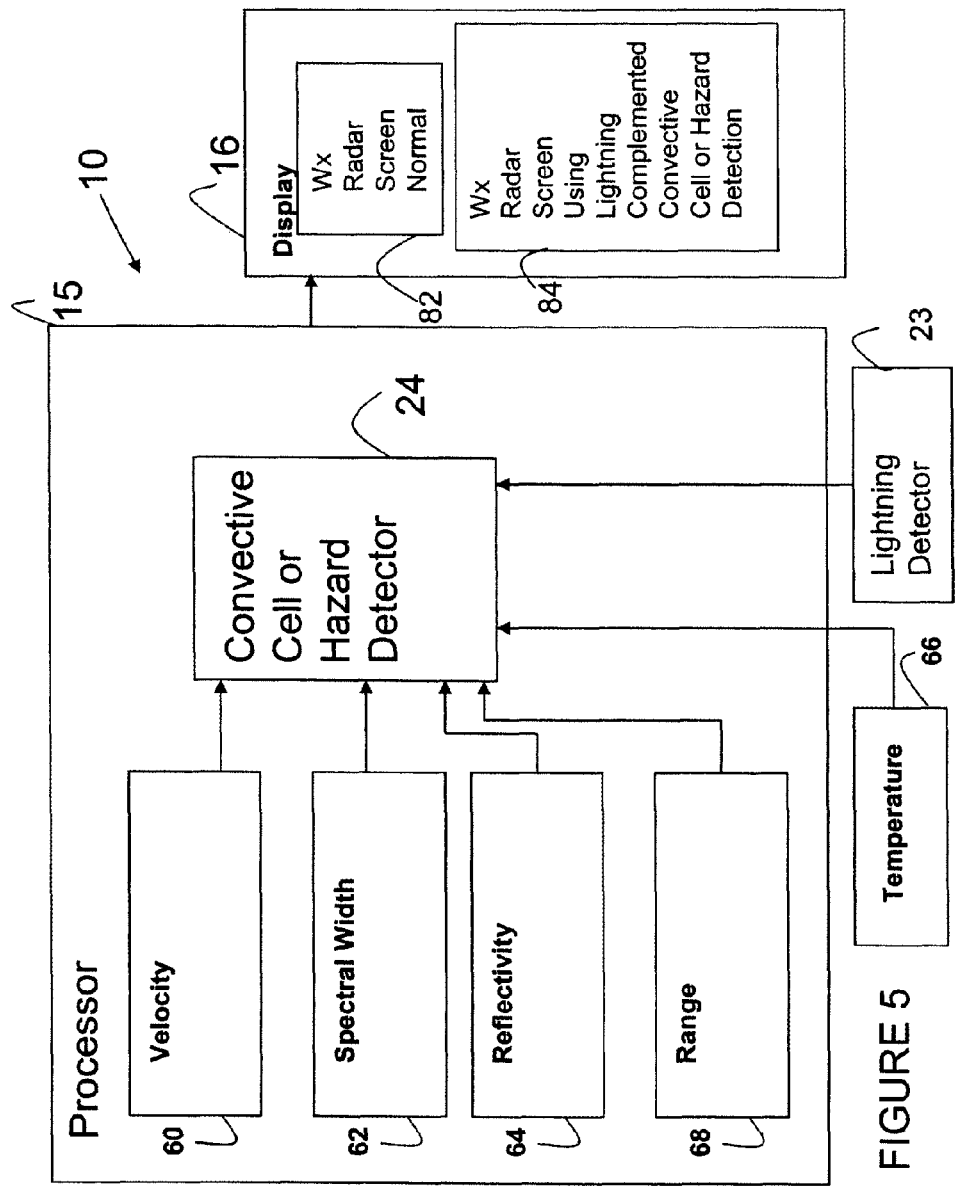
FIG. 5 is a more detailed exemplary general block diagram of a processor for the weather radar system illustrated in FIG. 1 in accordance with another exemplary embodiment.

In FIG. 2, processor 15 identifies weather systems 51 and 55 and provides a display of weather systems 51 and 55 for aircraft 49 on display 16. Systems 51 and 55 can be marked without lightning bolts 67 and 69 on a normal weather radar screen 82 (FIG. 5). Indications of lightning bolts 67 can be provided on a weather radar screen using a weather radar screen 84 (FIG. 5) that uses lightning complemented convective cell and/or hazard detection. Weather systems 51 and 55 are denoted using the standard green, yellow and red colors for severity of weather.

Detector 24 preferably utilizes information from lightning detector 23 to identify and locate lightning bolts 67 on display 16. As shown on graph 47 (FIG. 2), a line 73 indicates a flash density on a Y axis 37 and an azimuth angle on an X axis 35. A maximum at dashed line 69 indicates a pointing angle to the highest flash density of lightning. Applicants believe that a reasonable pointing angle utilizing a conventional lightning detector is still provided even though relatively weak/ranging data can be associated with bolts 67.

Utilizing the lightning data, hazard detector 24 can identify cell or system 55 as including more hazardous weather and cell 59 as not including as hazardous weather because of the limited or lack of lightning. Accordingly, a pilot can advantageously find a flight path through weather system 51 which may have been avoided as hazardous weather without the advantageous use of lightning data.

Flash rate history may be used to determine cell maturity. Cell maturity can be used to determine if a cell is a hazard. For example, growing and mature convective cells can be classified as hazardous whereas dissipating cells may not be classified as hazardous. The preferred embodiment uses the flash rate to assess maturity and convective hazard. Increasing flash rates verses time indicate a cell in a growth stage while decreasing flash rates verses time indicate a cell that is decaying. High continuing flash rates indicate possible mature super-cell convection.

The determination of cell maturity allows cells that are in the dissipating stages to be identified as potential flight paths when needed by an aircraft after some delay to allow decaying non-flashing cells to discharge. Flash rate history can be stored in memory 13.

In addition, data from lightening detector 23 can be utilized to detect weather in early stages of development. Data from lightening detector 23 can be utilized to determine the presence of whether in early stages of development, even before the convective weather has reached the altitude of the aircraft. Processor 15 can identify such weather by utilizing data from detector 23 and weather radar returns associated with weather regions beneath the aircraft. By determining such weather is in early stages of development, processor 15 can provide warning of a future risk in front of the aircraft as the cell develops. Cell maturity can be utilized to determine whether the cell is in a growth stage. As discussed above, cell maturity can be determined by flash rate history.

Figure 4:
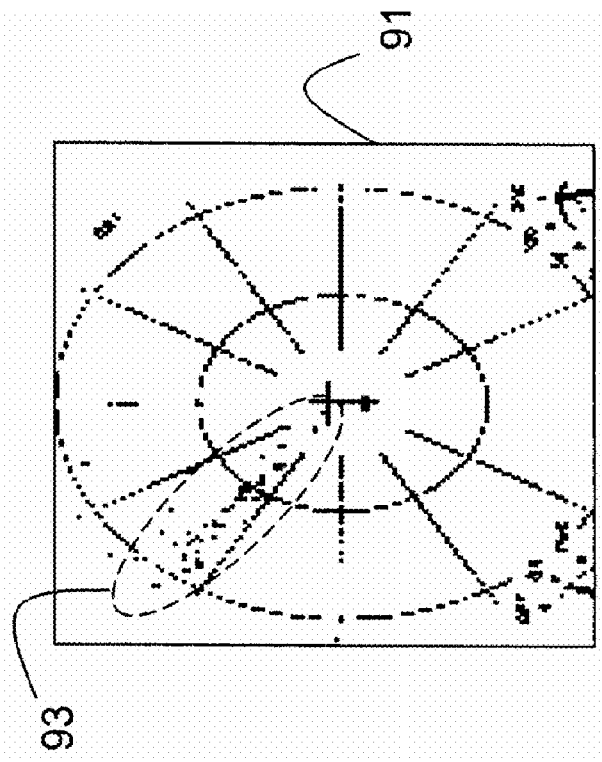
FIG. 4 is an illustration of a lightning sensor display.
Figure 3:
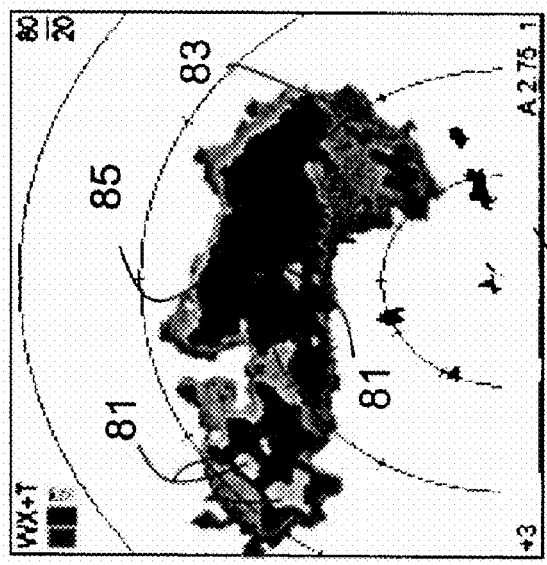
FIG. 3 is an illustration of a weather radar display.

With reference to FIG. 3, a screen 81 (a normal weather radar screen 82 in FIG. 5) shows weather including red regions 81, green regions 83, and yellow regions 85. With reference to FIG. 4, a screen 91 for a lightning detector shows the presence and location of lightning strikes encircled by oval 93. System 10 advantageously uses the data associated with screen 81 and screen 91 to identify convective cell and/or hazardous regions on a weather radar screen 84 (FIG. 2) that uses lightning complemented convective cell and/or hazard detection.

With reference to FIG. 5, convective cell detector 24 can receive various data inputs. Convective cell detector 24 can receive inputs derived from one or more of the following: velocity parameter, a spectral width parameter 62, a reflectivity parameter 64, and/or a range parameter 68. Processor 15 can generate parameters 60, 62, 64 and 68 based upon weather radar return data. Convective cell detector 24 can also receive temperature data 66 and data from lightning detector 23.

Convective cell detector 24 can process at least one of parameters 60, 62, 64, 66, 68 and data from detector 23 to provide a display screen 84 including hazard detection. In addition, convective cell detector 24 can cause system 10 to perform further analysis in light of information from lightning detector 23 or parameter 60, 62, 64, 58 and 66. The further analysis can even include causing system 10 to perform weather radar queuing and control in azimuth as well as examining new data or historical data.

Threat descriptions on display 16 can include lightning, hail, and turbulence. All three hazards can have substantial impact on airline operations and may be blended with a weather radar's solo threat assessments at shorter ranges. In one embodiment, the display of turbulence and potential lightning may be paired with entire cells and circled by a line of the normal turbulence color at lower levels of hazard. Regions of likely lightning and directly measured turbulence may use either a solid second level turbulence color or be encoded with an icon. Display 16 should allow slewing from the full cell identification of convective weather at long ranges to a shorter range sub-cell size regions of likely hazard.

Figure 6:
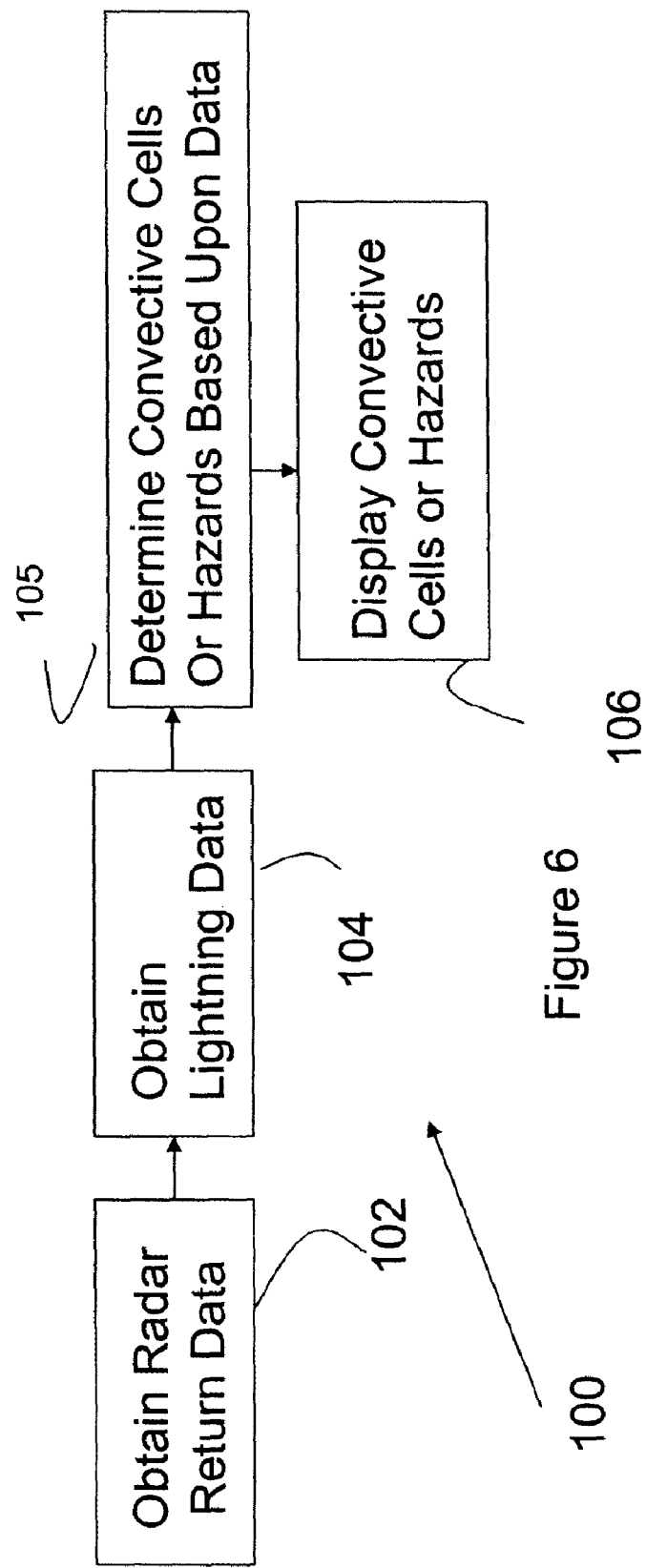
FIG. 6 is a flow diagram showing an operation of the weather radar system illustrated in FIG. 1 in accordance with another exemplary embodiment.

With reference to FIG. 6, a flow chart 100 shows exemplary of operation of system 10. System 10 obtains radar return data at a step 102 and obtains lightning data at a step 104. Utilizing both radar return data and lightning data, system 10 determines the presence of hazards based upon the data. Once system 10 determines convective cells and/or hazards based upon the data obtained from steps 102 and 104, the convective cells and associated hazards can be displayed at a step 106.

System 10 can utilize a variety of algorithms preferably implemented in software. In one embodiment, a correlation algorithm is utilized in detector 24 to correlate lightning data and reflectivity data.

In order to correlate lightning and reflectivity data, detector 24 minimally receives a lightning flash azimuth data from detector 23 and then performs spatial and temporal correlation of the lightning flash data and airborne radar reflectivity data from processor 15 in the following exemplary manner:

Spatial Correlation:

1. Preferably, the geometric or geo-referenced lightning flash representation models the accuracy of the lightning sensor. A geo-referenced line segment is generated using the sensor position, azimuth, and maximum range of detector 23. The geo-referenced line segment is stored in memory 13. If a range interval is provided for the lightning flash, the geo-referenced line segment end-points may be bounded by that range interval. Alternatively, two geo-referenced line segments may be calculated, bounding the azimuth uncertainty of the lightning flash.

2. Detector 24 segments the current detected reflectivity regions (weather objects) into disjoint reflectivity regions. Those disjoint reflectivity regions represent unique weather events and will be stored as geo-referenced shape descriptors (i.e. points, polygon, ellipse, etc.). Identifying disjoint weather events is valuable because it represents the aggregate contours of the reflectivity region and is a better representation of the total area of the weather event, as detected by system 10.

3. The lightning line segment and disjoint reflectivity regions are mapped to geo-referenced memory or local cartesion memory map. If the lightning line segment intersects a reflectivity region shape descriptor, then the lightning flash is associated with that lightning line segment, and therefore correlated with the weather event associated with the reflectivity shape descriptor. The lightning flash and weather event are now successfully correlated, so the weather event has at least one lightning flash associated with it.

4. If the line segment intersects more than one disjoint reflectivity region, then detector 24 may use one or more techniques such as Set Theory, Fuzzy, or probabilistic logic to determine to which disjoint reflectivity region, the lightning flash belongs. As an example, a set theory approach would define each disjoint reflectivity region as a unique "set" and lightning flashes would be an element correlated with each set based upon the axioms and rules that define varying degrees of membership. For example, a lightning flash line segment that intersects or bisects two sets (disjoint reflectivity regions) would violate an axiom where lightning flash elements can only belong to one set. Rules are used to determine which of the two reflectivity sets the element belongs. For example, an exemplary rule states for each bisected set, the proximity of the bisecting line to the bisected set's centroid may be compared to determine the set that is bisected closest to the centroid. The reflectivity set that is bisected closest to its centroid is the correlated set and the set that the lightning flash element belongs. Additional rules including uncertainty may also be modeled as part of the rules for membership.

5. If a lightning flash does not intersect or bisect a reflectivity region, then the lightning flash is correlated with the nearest reflectivity within 10 miles of the lightning flash. Otherwise, the lightning flash is probably from a weather event that is not currently being detected by system 10.

6. Previous steps are repeated as new reflectivity and lightning flash data are received.

Temporal Correlation:

7. Storing the reflectivity and lightning data is necessary for convective assessment and tracking reflectivity and lightning regions is useful for growth and decay assessment of the convective region. New geo-referenced disjoint reflectivity shape descriptors are generated as new data is received from the radar.

8. The new reflectivity shape descriptors are correlated with previously stored reflectivity shape descriptors so that weather events can be tracked over time.

9. New lightning flash data is correlated with the new reflectivity shape descriptors. Since the previously correlated lightning and reflectivity data is correlated with the new data through the reflectivity tracking, detector 24 can determine the cumulative number of lightning strikes (total lightning strikes) associated with a weather event over time.

10. As new lightning flash data is correlated with new and previous reflectivity, the lightning flash data associated with each disjoint reflectivity region may be aggregated to form a unique lightning region or shape descriptor associated with the weather event. For example, if eight lightning flashes were correlated with a weather event over the last minute, the position and area uncertainty of each lightning flash is modeled and may be mapped to geo-referenced memory. A shape descriptor may be generated representing the aggregate lightning region associated with that weather event. That information is useful for convective assessment of the weather event as well as weather event tracking.

11. Previous steps are repeated as new reflectivity and lightning flash data is received.

The above description of the spatial correlation and temporal correlation algorithm is for example only. Various other algorithms can be utilized to interpret lightning data and reflectivity data. Once spatial and temporal correlation is achieved, detector 23 can analyze the correlated data to identify convective and/or hazard regions.

Figure 7:
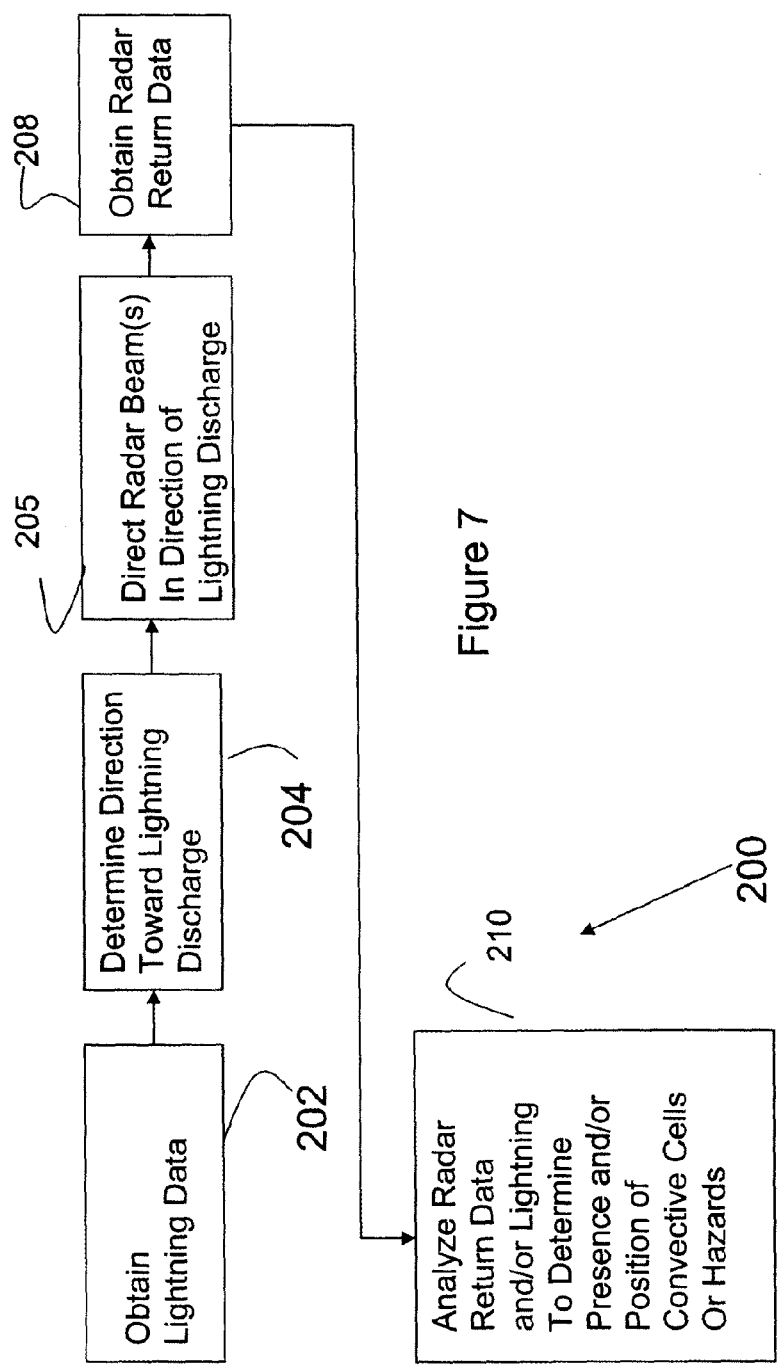
FIG. 7 is another flow diagram showing an operation of the weather radar system illustrated in FIG. 1 in accordance with still another exemplary embodiment.

With reference with FIG. 7, a flow chart 200 shows another exemplary operation of system 10. At a step 202, lightning data is obtained. At a step 204, a direction associated with lightning discharges determine from the lightning data is determined.

At step 205, radar queuing is performed. Radar queuing allows system 10 to provide radar beams and obtain radar returns from a particular area associated with the lightning discharge. For example, system 10 can identify a region based upon the lightning data. Further, system 10 after identifying the region with lightning may command the antenna to dwell longer in limited regions of space for higher loop gain. Such radar queuing allows system 10 to detect new thunder storms growing under the radar sample volume.

According to one embodiment, a radar queuing strategy can be developed to maximize convective cell identification and detection. When lightning detector 24 produces an azimuth with a reasonable chance of a cell being alone, the radar scan can be both focused in time and changed in properties to maximize cell detection along that line. Vertical scans may be used alone the line detection to best detect early convection or cells below the current normal radar scan altitude. For short range detection, such as detection of a cell below the current scanning system that is growing, system 10 can use freezing point (temperature detection) to assist. Freezing point is an initial growth point for most convective cells so starting there at short ranges is a reasonable scan strategy. (This case assumes a lightning track before detection by radar returns.)

In addition, radar queuing allows Low Probability of Intercept (LPI) operations since only limited azimuth angles need to be scanned. In this way, system 10 advantageously samples azimuth regions that are likely to have convective activity while limiting radar pulses that may allow an adversary to produce a bearing on the aircraft carrying the LPI radar. Radar queuing allows system 10 to use its available sample time more efficiently, allowing detections at both longer ranges and at lower radar reflectivity levels.

Preferably, analysis using the weather radar with lightning return data is performed at a step 208. The analysis can allow weather cells to be characterized as convective versus non-convective cells. Cells that are significant convective cells will have associated flash rates greater than 3 flashes per 10 minute interval (see Hallowell et al. (1999))

In addition, convective regions can be identified for Intertropical Convergence Zone (ITCZ) penetration. Since ITCZ weather returns have a different characteristic from other weather environments (such as Continental United States (CONUS)), the association and hazard logic may be different (See *On the Relationship Between Lightning and Convective Rainfall over the Central Pacific Ocean*, Pessi et al. 2004). Penetrations should be made in regions where flash rates are at a minimum. Since cell maturity is somewhat related to flash rate, regions with non-existent or decaying flash rates may targeted as possible penetration points. Further, cell characterization allows identification of false weather returns caused by anomalous propagation and discrimination of tropical weather from convective cells. Further, analysis of the weather radar return data based upon radar queuing and use of lightning data allows characterization of convective cell maturity and inferences of hail to be determined.

Figure 10:
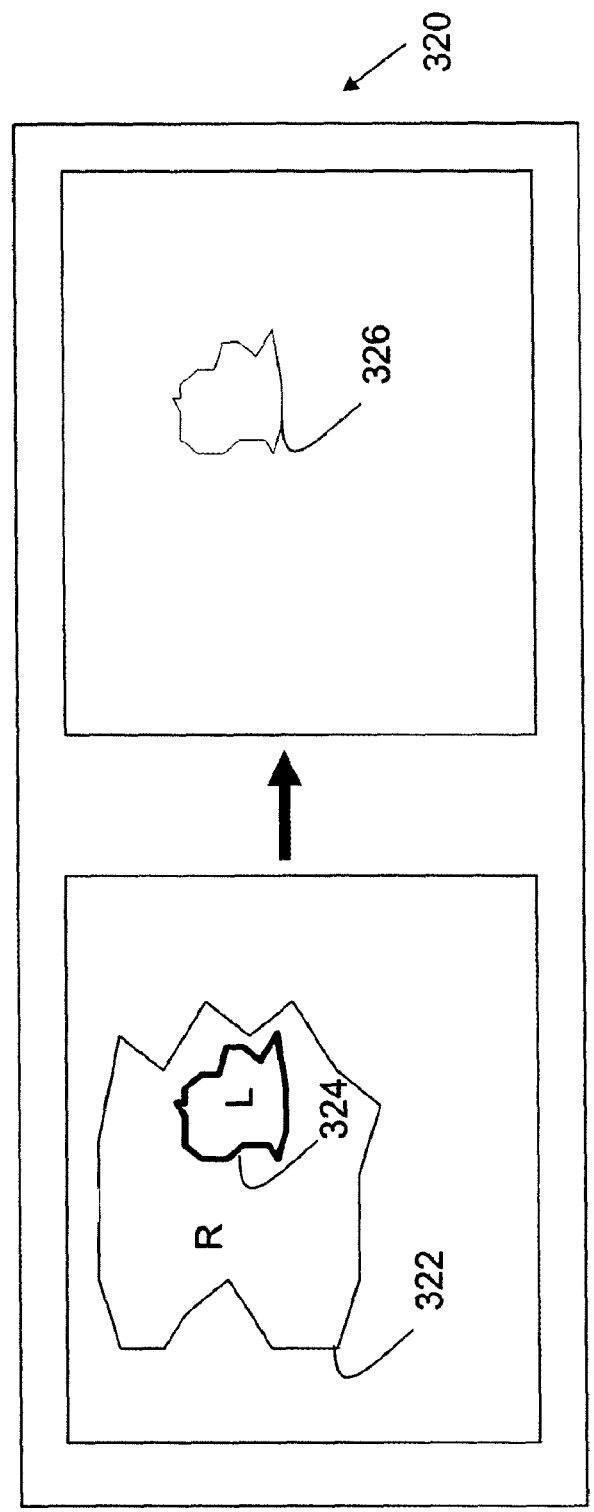
FIG. 10 is a general block diagram showing a union algorithm for determining the location of a convective cell for use in the system illustrated in FIG. 1 in accordance with yet still another exemplary embodiment.

With reference to FIGS. 8-10, system 10 can implement an algorithm to perform various types of detection identification schemes. These schemes can be used to define the area of the convective cell or hazard region. For example in FIG. 8, a cross-correlation detection scheme is represented in a diagram 300. A region 302 is detected from weather radar returns and a region 304 is detected from a lightning detector. Regions 302 and 304 are correlated in time and space. A region 306 is shown as a convective cell region or hazard region because it is a region common to both regions 302 and 304.

With reference to FIG. 9, an additive detection scheme is represented in a diagram 310. A region 312 associated with detection by weather radar returns and a region 314 associated with detection by lightning data is utilized to provide a region 316 associated with convective cells. Region 316 contains regions that are in either region 312 or 314.

With reference to FIG. 10, a drawing shows a subset detection scheme. Region 322 is the region determined by weather radar returns and region 324 is the region determined from lightning data. Region 324 is entirely within region 322. A region 326 representing region 324 which is within region 322 is shown as a convective cell or hazard region.

In alternative embodiments, the additive, cross qualify, and subset algorithms can be adjusted to take into account various factors including geographic locations, ranges of radar returns and lightning data, temperatures, etc. For example, radar returns tend to be more accurate at shorter ranges and accordingly greater weight may be given to regions detected by weather radar at shorter ranges. Longer range detection may be more accurate for lightning sensors. Accordingly, longer range detection may be given more weight when done by lightning detector 23.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A weather radar processing system comprising:
processing electronics for determining a presence of a hazardous region, the processing electronics receiving weather radar data and lightning detection data, the weather radar data related to the radar returns received by radar electronics, the processing electronics determining a position and size of the hazardous region in response to the weather radar data and the lightning detection data, wherein the weather radar data and the lightning detection data are temporally and spatially correlated when determining the position and the size of the hazardous region.

2. The weather radar processing system of claim 1, wherein the processing electronics to cause the radar electronics to provide a weather radar beam toward the hazardous region in response to the lightning detection data.

3. The weather radar processing system of claim 1, wherein the processing electronics determine disjointed reflectivity regions for spatial correlation.

4. The weather radar processing system of claim 1, wherein the processing electronics provide an electronic representation of a line segment derived from the lightning detection data for spatial correlation.

5. The weather radar processing system of claim 1, wherein the lightning detection data includes radar lightning flash history data and the processing electronics are configured to determine the position and size from the radar lightning flash history data or lightning flash history data correlated with the radar returns.

6. The weather radar processing system of claim 4, wherein the processing electronics determine disjointed reflectivity regions for spatial correlation, wherein the processing electronics identify the hazardous region at least in part by determining if the line segment intersects one of the reflectivity regions.

7. The weather radar processing system of claim 1, wherein fuzzy logic, set theory or probabilistic logic is used by the processing electronics to identify the hazardous region if the segment intersects more than one of the reflectivity regions.

8. The weather radar processing system of claim 1, further comprising:
an on-board lightning sensor for providing signals for the lightning detection data used by the processing electronics.

9. A method for operating a weather radar system on an aircraft, the method comprising:
receiving lightning sensor data;
determining a direction to a region associated with lightning in response to the lighting sensor data; and
providing a command to cause the weather radar system to provide at least one radar beam in the direction to the region.

10. The method of claim 9, further comprising:
determining, on-board the aircraft, a size and position of a hazardous region using the lightning sensor data and radar returns from the at least one radar beam.

11. The method of claim 10, wherein the size and position are determined using spatial and temporal correlation of the lightning sensor data and weather data associated with the radar returns.

12. The method of claim 10, wherein the hazardous region is a region having a convective cell.

13. The method of claim 10, wherein the radar returns are at least one of: multi-scan radar returns and volumetric scanning radar returns.

14. The method of claim 10, wherein the lightning sensor data is received from an on-board lightning sensor.

15. The method of claim 10, further comprising:
displaying an indication of the hazardous region on a weather radar display, wherein the indication is at least one of a textual symbol and a color.

16. The method of claim 15, further comprising:
providing the indication on the weather radar display using the radar returns and the lightning sensor data.

17. A system for on-board an aircraft and for determining a presence of a hazard for the aircraft, comprising:
a processor communicably coupled to a computer readable medium, the computer readable medium comprising:
instructions for determining a position and size of the hazard based on lightning detection data and weather radar data, wherein the position and size are determined using a correlation of the lightning detection data and the weather data.

18. The system of claim 17, wherein the computer medium further comprises:
instructions for causing radar electronics to provide a weather radar beam to the position in response to the lightning detection data.

19. The system of claim 18, wherein the computer medium further comprises:
instructions for detecting and determining a position of a convective cell from a weather radar return obtained in response to the weather radar beam.

20. The system of claim 19, wherein the computer medium further comprises:
instructions for calculating an azimuth bias associated with the weather data or the lightning data.

* * * * *